(12) United States Patent
Petrenko

(10) Patent No.: US 8,353,312 B2
(45) Date of Patent: Jan. 15, 2013

(54) PIEZOELECTRIC VALVE

(75) Inventor: Serhiy Fedorovich Petrenko, Kiev (UA)

(73) Assignee: U.S. Department of Energy, Washington, DC (US)

( * ) Notice: Subject to any disclaimer, the term of this patent is extended or adjusted under 35 U.S.C. 154(b) by 1524 days.

(21) Appl. No.: 11/406,335

(22) Filed: Apr. 19, 2006

(65) Prior Publication Data
US 2007/0119505 A1    May 31, 2007

(30) Foreign Application Priority Data

Nov. 29, 2005  (UA) .................................. 200511316

(51) Int. Cl.
*F16K 37/00* (2006.01)
(52) U.S. Cl. .... 137/554; 137/828; 310/322; 251/129.11
(58) Field of Classification Search .................. 137/828, 137/554; 251/129.03; 310/322, 323.01, 310/323.02, 323.17, 348
See application file for complete search history.

(56) References Cited

U.S. PATENT DOCUMENTS

| | | | |
|---|---|---|---|
| 4,453,103 A * | 6/1984 | Vishnevsky et al. | 310/323.02 |
| 4,915,074 A | 4/1990 | Arai | |
| 4,959,580 A * | 9/1990 | Vishnevsky et al. | 310/323.02 |
| 5,055,750 A * | 10/1991 | Fukui et al. | 318/400.01 |
| 5,099,867 A * | 3/1992 | Emery | 251/129.11 |
| 5,710,491 A * | 1/1998 | Takagi et al. | 318/116 |
| 5,917,267 A * | 6/1999 | Miyazawa et al. | 310/323.01 |
| 5,917,268 A * | 6/1999 | Takagi | 310/323.02 |
| 6,230,738 B1 * | 5/2001 | Watanabe et al. | 251/129.11 |
| 6,244,296 B1 * | 6/2001 | Lafler et al. | 137/554 |

\* cited by examiner

*Primary Examiner* — John K Fristoe, Jr.
*Assistant Examiner* — Andrew J Rost
(74) *Attorney, Agent, or Firm* — Michelle P. Nguyen; John T. Lucas

(57) ABSTRACT

A motorized valve has a housing having an inlet and an outlet to be connected to a pipeline, a saddle connected with the housing, a turn plug having a rod, the turn plug cooperating with the saddle, and a drive for turning the valve body and formed as a piezoelectric drive, the piezoelectric drive including a piezoelectric generator of radially directed standing acoustic waves, which is connected with the housing and is connectable with a pulse current source, and a rotor operatively connected with the piezoelectric generator and kinematically connected with the rod of the turn plug so as to turn the turn plug when the rotor is actuated by the piezoelectric generator.

11 Claims, 1 Drawing Sheet

PIEZOELECTRIC VALVE

PRIORITY CLAIM

Priority is claimed from the Ukrainian patent application filed Nov. 29, 2005, Serial No. 200511316.

BACKGROUND OF THE INVENTION

The present invention relates to fast-acting motorized valves with axis-symmetrical saddles and turnable (cylindrical, conical, and preferably spherical) valve bodies. Such valves are designed for accurate regulation of flows of arbitrary flow media based on liquids and/or gasses and for closing/opening of vacuum lines.

Valves with turnable valve bodies and manual drives for their turning are known. Such valves are widely used in household, laboratory and industrial distribution networks for gas and water supply, for closing and opening of corresponding pipelines and regulation of gas and liquid supplies in the cases when an operator can manually turn the valve body, and fast activation of the valve and angular accuracy of positioning of the valve body in the saddle are not critical parameters.

However, in energy generating industries, in particular in thermal and nuclear power plants, in chemical industry and even in food industry, as well as for oil and gas pipelines, it is necessary to provide reliable and fast-acting valves, in which a starting torque significantly exceeds the manual possibilities of an operator, and in which it is necessary to provide accuracy of positioning of the valve bodies relative to the seats, and of the geometric axes of inlet and outlet pipes, at the level of several angular seconds. There is also a need to provide high-accuracy microvalves, in which a starting torque necessary for overcoming adhesion of the valve body to the seat is significantly smaller than a torque generatable by an operator. Such valves are used for example for piping of laboratory instruments, such as chromatographs, volume dosing devices for liquid medical substances in a pharmaceutical industry.

Motorized valves with turnable valve bodies are used for this reason in industrial equipment and in devices for scientific research, such as in motor driven valves of the firm "SAMSON", Germany, model types 3241-4, type V2001-E1, type V2001-E3, type 3222/5825, type 3213/5825, type 3260/3374, type 3241-4 and model DAN 1.SN of the firm "JOVENTA" Austria.

These valves are provided with "classic" direct current or alternating current electric motors. It is therefore necessary to introduce multi-stage reducers between the outlet shafts of the motors and the rods of the turnable valve bodies of the valves, in order to increase the speed of rotation to several revolutions per minute and to increase the starting torques to the level which is sufficient for overcoming the adhesion of the valve body relative to the seat, which is especially pronounced for spherical valves even when they are used in low-pressure pipelines. Moreover, the braking of the block "classic electric motor-multi-stage reducer" with fixation of the output shaft of the reducer and of the turnable valve body of the valve connected to it, is a substantially complicated technical problem.

Correspondingly, in order to switch the turnable valve bodies of the valves with the electric motors from the position "open" to the position "closed" or vice versa, frequently the required time is from a few tenths of seconds to several minutes. This is acceptable if the motorized valve with the turnable valve body is located on the oil or gas pipeline. However, it is not acceptable when the valve must provide a cutoff of a raw material supply, for example ethylene into an explosion-prone apparatus for synthesis of polyethylene at a high pressure about 250 KPa.

Furthermore, the block "classic electric motor-multi-stage reducer" even, if it has a significant frictional interaction between kinematic links of the reducer, can not provide by itself the accuracy of angular positioning of the valve bodies less than 3°. Therefore, the valve devices are usually provided with complicated and expensive control means. In the example of the German firm, SIEMENS, device SIPART PS2, a "smart" drive, is provided for positioning of reciprocatingly movable slides or turnable valve bodies identified as an intelligent positioner for linear and rotary valves, double and single-acting actuators.

A motorized valve with a turnable valve body, which is the closest to the proposed new valve, is known from the information of the Korean firm "Daehan Control Tech Co., Ltd." This valve operates as a cutoff valve on pipelines with high pressure, and belongs to the SMART VALVE POSITIONER SSL & SSR Series. It includes a housing with at least one inlet and at least one outlet pipe(s) for connection to a pipeline system, an axis-symmetrical seat, which is fixedly arranged inside the housing, a turnable valve body, which sits on the seat and is provided with a rod for connection to an output shaft of a rotary drive, and the rotary drive for the valve body, based on a pneumatic motor, provided with means for connection to a control system.

The output shaft of a rotor of the pneumatic motor is connected kinematically with the valve body of the valve through a cumbersome multi-stage reducer, since the torque generated by pneumatic motors can be regulated by changing a pressure of a fresh working body only within narrow limits. The pipeline for feeding the pneumatic motor with compressed air is provided with a piezoelectric valve/cutoff. The control system for the motor-powered valve is provided with a sensor of angular position of the valve body relative to the seat.

Therefore, the introduction of the cumbersome multi-stage mechanical transmission between the output shaft of the pneumatic motor and the rod of the valve body significantly increases the mass and size of the motorized valve, increases the time of triggering which usually exceeds 10 seconds, and, due to inevitable gaps, does not allow one to position the turnable valve body relative to the saddle with an angular accuracy less than 1°.

SUMMARY OF THE INVENTION

Accordingly, it is an object of the present invention to provide a motorized valve of the above mentioned general type, which is a further improvement of the existing valves.

More particularly, it is an object of the present invention to provide a valve in which the electric motor is replaced and the length of the kinematic chain between the rotor of the motor and the rod of the turn plug is reduced, so that the motorized valve with a turn plug can have a significantly smaller size and mass, a reduced activation time, and an increased accuracy in the angular positioning of the turn plug relative to the saddle.

In keeping with these objects and with others which will become apparent hereinafter, one feature of the present invention resides, briefly stated, in a motorized valve, comprising a housing having an inlet and an outlet tubes; a saddle connected with said housing; a turn plug cooperating with said saddle; and a drive for turning said valve body and formed as a piezoelectric drive, said piezoelectric drive including a piezoelectric generator of radially directed standing acoustic waves, which is connected with said housing and is connectable with a pulse current source, and a rotor operatively connected with said piezoelectric generator and kinematically connected with said turn plug so as to turn said turn plug when said rotor is actuated by said piezoelectric generator.

When the valve is designed in accordance with the present invention, it is possible to easily regulate the output power, the frequency of operation and the "start-stop" or quazi-continuous mode of operation of the piezoelectric valve within wide limits by means of regulated sources of pulse current. Correspondingly, it is possible to provide high torques (up to 100 Nm), which in the majority of cases is sufficient to overcome adhesion of the turn plug to the saddle. Moreover, the high frequency of mechanical oscillations (up to 1 MHz) in the form of radially directed standing acoustic waves provides a fast activation of the valve during transition between the positions "open" and "closed" of not more than 0.5 sec, and a possibility of positioning of the turnable valve body relative to the saddle at the level of several angular seconds.

Elastic ratchet pushers efficiently provide not only the transmission of torque from a wave shell, which pulsates radially in the same cycle with the mechanical vibrations of the piezoelectric generator, but also efficiently brake the turn plug in a given position during each interruption of the operation of the pulse current source.

In accordance with an additional feature of the present invention, the resilient ring is provided with at least two resilient ratchet pushers which are located at substantially equal angular distances from one another. This reduces the probability of slippage of the ring-shaped rotor relative to the pushers during each start of the piezoelectric generator and facilitates the braking of the rotor and of the turn plug during each turning off of the pulse current source.

A further feature of the present invention is that the wave shell has the shape of a ring-shaped casing and acoustically tightly embraces the piezoelectric generator along its side surface, while at least one resilient ratchet pusher is connected to the wall of the ratchet casing. In this construction, each resilient ring-shaped pusher is practically equally loaded during the transmission of the torque to the rotor and also during its braking.

A further new feature of the present invention is that the rotor is fixedly connected with the rod of the turn plug. Such a kinematic connection in the majority of cases is sufficient for the efficient operation of the proposed valve.

Still a further feature of the present invention is that the rotor is provided with at least one marker of its angular position, and the housing of the valve is provided with at least one sensor, cooperating with each other.

Still a further feature of the present invention is that each marker is formed as a permanent magnet, while each sensor is formed as a magneto-electric convertor.

Still another feature of the present invention is that the motorized valve is provided with a control system which includes a programmable generator of cycle frequency, a pulse amplifier-interrupter connected with an electric power source, with a control output of the generator of cycle frequency, and with an electric input of the ring-shaped piezoelectric generator of radially directed standing acoustic waves, wherein the former of modes of operation of the valve drive which is connected with additional control inputs of the pulse amplifier-interrupter and, through a feedback chain, to an output of each sensor and provides the mode "start-stop" for opening and closing of the valve, or pseudo-continuous mode "step-by-step" for an accurate regulation of a flow rate of the flowing medium, which flows through the valve.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
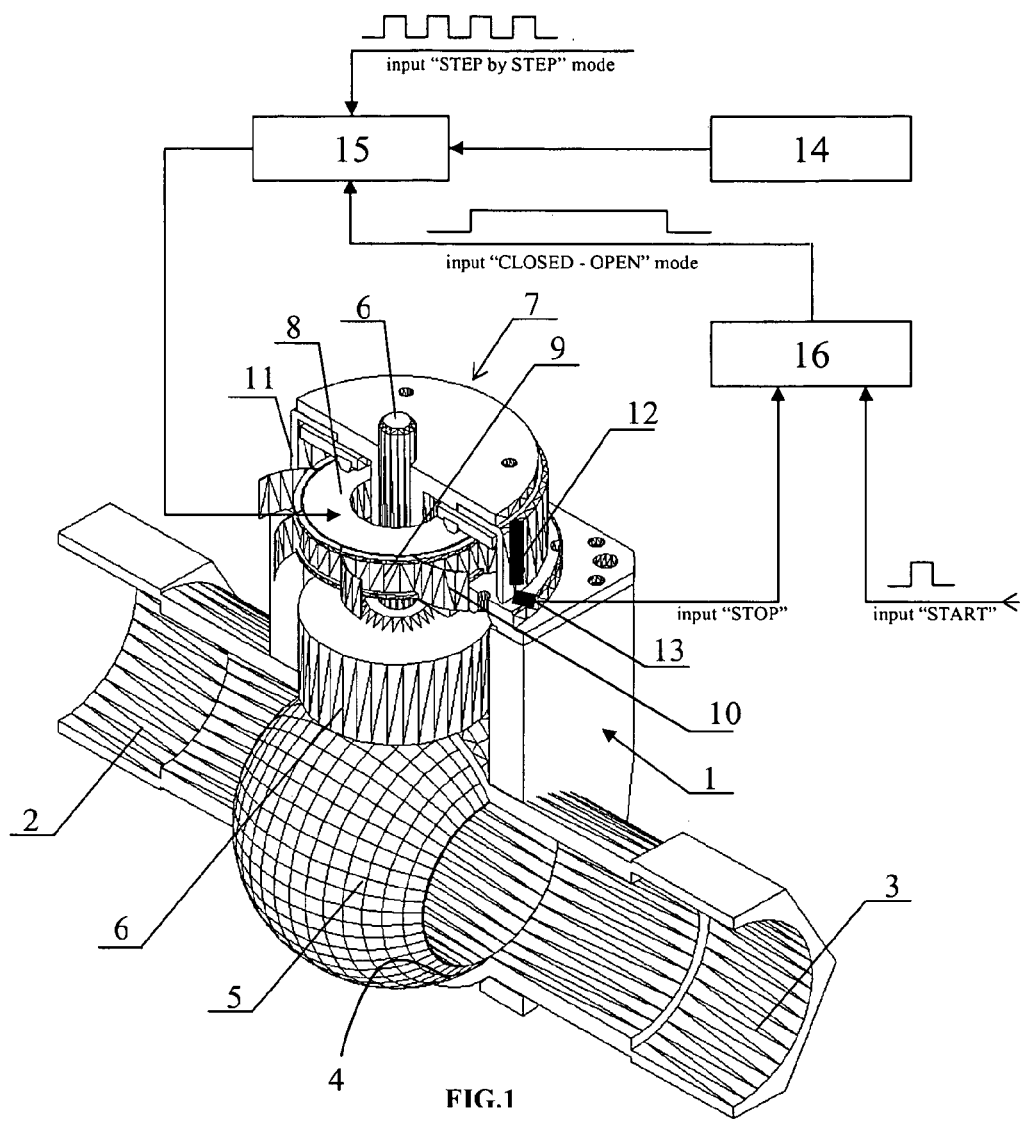
FIG. 1 is a perspective view of a motorized valve with a piezoelectric generator in accordance with the present invention, wherein a turn plug is located in a position "open", and wherein additional elements of control system of the valve are shown.
Figure 2:
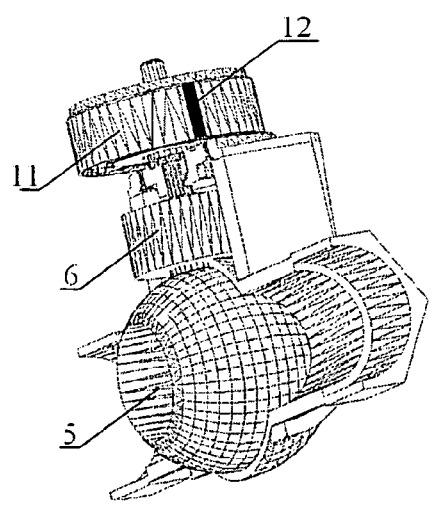
FIG. 2 is a view substantially corresponding to the view of FIG. 1 on a reduced scale, with the turn plug in the position "closed".

A valve in accordance with the present invention has a hollow throughgoing casing which is identified with reference numeral 1 and has an input pipe 2 and an outlet pipe 3 for connection to a pipeline. It further has an axis-symmetrical saddle 4 which is fixedly arranged inside the housing 1, and can be formed of one piece with the latter. The saddle 4 can be cylindrical, conical, or in particular spherical as shown in the drawings.

The valve further has a turn plug, which is identified as a whole with reference numeral 5. It can be cylindrical, conical, or in particular spherical, as shown in the drawings. It is placed on the saddle 4, and in its upper part is provided with a rod 6. The rod 6 can be formed as a stepped rod. A drive for turning of the turn plug 5 is based on a piezoelectric drive and identified with reference numeral 7.

The piezoelectric drive 7 has a ring-shaped piezoelectric generator 8, which generates radially directed standing acoustic valves. It is fixedly connected with the housing 1 of the valve and is provided with means for connection to a pulse current source and to a control system, which will be described herein below. The piezoelectric drive 7 further has a wave shell 9, which is acoustically tightly connected with the piezoelectric generator 8 and provided with at least one resilient ratchet pusher 10, or preferably with two ratchet pushers. The ratchet pushers 10 are connected with the wave shell 9 at substantially equal angular distances from one another.

The piezoelectric drive further has a rotor 11, which is located with a uniform gap relative to the piezoelectric generator 8. The rotor 11 is in frictional contact with the at least one resilient ratchet pusher 10 and is connected kinematically with the rod 6 of the turn plug 5.

The rotor 11 has substantially the shape of a cylindrical casing with a cover, having a central opening for a free location of an end part of the rod 6 and is located with a uniform gap above an upper surface of the ring-shaped piezoelectric generator 8.

The wave shell 9 can have the shape of a ring-shaped casing, which acoustically tightly embraces the piezoelectric generator 8 over its side surface, as shown in the drawings. In this construction, each resilient ratchet pusher 10 is connected with its one end to a side wall of the wave shell 9, and with its other end in frictional contact with the rotor 11 from the inner side of its part that has a shape of the cylindrical casing.

It is to be understood that the wave shell 9 can have the shape of a disk with the central opening, which acoustically is tightly connected to the upper end of the piezoelectric generator 8, although this embodiment is not shown in the drawings. It is to be understood that in this case each resilient ratchet pusher 10 can be connected with its one end to the upper end of the wave shell 9, and with its other end in frictional contact with the rotor 11 from the inner side of its cover.

In a simple case, the rotor 11 is fixedly connected with the rod 6 of the turn plug 5. However, in some cases, for the kinematic connection of the rotor 11 with the rod 8, it is possible to use couplings and/or one-stage reducing or increasing rotor transmissions.

The rotor 11, as a rule, has at least one marker 12 of an angular position. Correspondingly, on the casing 1 of the valve, at least one sensor 13 is arranged. It is convenient when each marker 12 is formed as a permanent (micro) magnet, while each sensor 13 is formed as a magneto-electric convertor, incorporated in a control system of the valve.

The control system shown in FIG. 1 can include a preferably programmable generator 14 of a cycle frequency, which is usually selected within the interval of 100 KHz-1.0 MHz. It also has a pulse amplifier-interrupter 15 which is connected to a suitable source of electric power that is not shown in the drawings, to a control output of the generator 14 that generates a cycle frequency, and to an electric input (or not shown plates) of the ring-shaped piezoelectric generator 8 which generates radially directed standing acoustic valves.

It further has a former 16 of modes of operation for the valve drive, including a "mode-start-stop" for opening and closing of the valve, or a pseudo-continuous mode "step-by-step" for accurate regulation of flow rate of a flowing medium, that flows through the valve. The former 16 is connected, as a rule, to additional control inputs of the pulse amplifier-interrupter 15, and through the feedback chain, to the output of each sensor 13.

It should be mentioned that the valve can be provided with several inlet 2 pipes and/or outlet pipes 3. It is possible to make the housing 1 with the pipes 2 and 3 and the saddle 4 with the turn plug 5 from corresponding metallic and/or ceramic and/or polymeric materials which are known persons skilled in the art. These materials can be selected with consideration of temperature and/or chemical aggressiveness and/or abrasive properties of the flowing media. It is also possible to make the saddle 4 and/or turn plug 5 with antifriction (permanent or detachable) coatings. Finally, it is possible to arbitrarily combine these features with the main feature of the present invention.

The motorized valve operates in the following manner:

First the generator 14 is turned on or the programmable generator 14 is tuned for the desired cycle frequency or a set of frequencies, and a desired mode of operation of the valve drive is set by the former 16. Then the pulse amplifier-interrupter 15 is connected to the source of electric power (not shown).

The ring-shaped piezoelectric generator 8, under the action of power pulses, supplied from the output of the pulse amplifier-interrupter 15, generates radially directed standing acoustic waves. These waves deform the resilient ring 9, which tries to bend each resilient ratchet pusher 10 connected with it, and therefore forces it to transmit a mechanical pulse to the rotor 11, that turns the turn plug 5 of the valve relative to the saddle 4.

Several power pulses which follow one another, usually two-three pulses, provide turning of the turn plug 5 relative to the saddle 4 over approximately 1" (1 angular second).

In the intervals between the power pulses, each resilient ratchet pusher 10 brakes the rotor 11 and correspondingly the turn plug 5 relative to the saddle 4. The limit of accuracy of positioning of the turn plug 5 is also approximately equal to 1" (1 angular second).

The sensors 13 which are immovable relative to the housing 1 sense the position of the markers 12 which turn together with the rotor 11. The data about the current (factual) angular position of the turn plug 5 relative to the saddle 4 are taken into consideration by the former 16 of the modes of operation of the valve drive.

The experiments with the inventive motorized valve in accordance with the present invention with a throughflow diameter ¼" showed the following results:

| | |
|---|---|
| Time of opening (closing), sec | <0.5 |
| Accuracy of positioning (angular step), angular second | 1.0 |
| Time of response (time of forming a minimum angular step), microsec | 50 |
| Mass of valve with drive, g | 250 |
| Supply voltage, W | 12 |
| Consumed power Wm | 4-6 |

The valves in accordance with the present invention can be used for fast cutoff and/or high accuracy regulation of a flow rate of arbitrary flowable media.

It will be understood that each of the elements described above, or two or more together, may also find a useful application in other types of constructions differing from the types described above.

While the invention has been illustrated and described as embodied in motorized valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A motorized valve, comprising
a hollow case having at least one input tube and at least one output tube;
a saddle connected with said hollow case;
a turn plug having a rod, wherein said turn plug cooperates with said saddle;
a piezoelectric motor, said piezoelectric motor including a piezoelectric generator of radially directed standing acoustic waves, which is fixedly connected with said hollow case and is connectable with a pulse current source, and a rotor operatively connected with said piezoelectric generator and kinematically connected with said rod of said turn plug so as to turn said turn plug when said rotor is actuated by said piezoelectric generator, wherein the length of said kinematic connection between said rotor and said rod is reduced, resulting in said motorized valve having a smaller size and mass and a reduced activation time, and an increased accuracy in angular positioning of said turn plug relative to said saddle;
a control system including a generator of a cycle frequency, a pulse amplifier-interrupter connectable to the pulse current source, to a control output of said generator of the cycle frequency, and to an electric input of said piezoelectric generator;

and a former of modes of operation connected to additional control inputs of said pulse amplifier-interrupter and also connected through a feedback chain to an output of said at least one sensor so as to provide modes consisting of a "start-stop" mode for opening and closing of the valve, and a pseudo-continuous "step-by-step" mode for accurate regulation of a flow rate of a flowing medium which flows through the valve;

wherein the generator provides mechanical oscillations of up to about 1 MHz in the form of radially standing acoustic waves during a transition period between the open and closed positions of said valve, the transition period lasting for not more than 0.5 seconds.

2. A motorized valve as defined in claim 1, wherein said piezoelectric generator is configured as a ring-shaped piezoelectric generator.

3. A motorized valve as defined in claim 1; and further comprising a wave shell which is acoustically tightly connected with said piezoelectric generator and provided with at least one resilient ratchet pusher, said rotor being in a frictional contact with said at least one resilient ratchet pusher, and wherein said wave shell pulsates radially in the same cycle with said acoustic waves of said piezoelectric generator.

4. A motorized valve as defined in claim 3, wherein said wave shell has a second such resilient ratchet pusher, said pushers being located at substantially equal angular distances from one another.

5. A motorized valve as defined in claim 4, wherein said pushers provide transmission of torque from said wave shell.

6. A motorized valve as defined in claim 4, wherein said pushers brake said turn plug during each interruption of operation of said pulse current source.

7. A motorized valve as defined in claim 3, wherein said wave shell has a shape of a ring-shaped casing and acoustically tightly embraces said piezoelectric generator over its side surface, wherein said at least one resilient ratchet pusher is connected to an external cylindrical surface of said ring-shaped casing.

8. A motorized valve as defined in claim 1, wherein said rotor is provided with at least one marker of an angular position, while said hollow case is provided with at least one sensor cooperating with said at least one marker.

9. A motorized valve as defined in claim 8, wherein each of said markers comprises a permanent magnet, while each of said sensors comprises a magneto-electric converter.

10. A motorized valve as defined in claim 1, further providing torques up to about 100 Nm.

11. A motorized valve as defined in claim 1, wherein said generator of a cycle frequency is selected within the interval of about 100 KHz to about 1.0 MHz.

* * * * *